United States Patent [19]

Artzberger

[11] 4,068,338
[45] Jan. 17, 1978

[54] RAMP CONSTRUCTION FOR A DOCKBOARD

[75] Inventor: Thomas G. Artzberger, Menomonee Falls, Wis.

[73] Assignee: Kelley Company, Inc., Milwaukee, Wis.

[21] Appl. No.: 728,636

[22] Filed: Oct. 1, 1976

[51] Int. Cl.² .............................................. E01D 1/00
[52] U.S. Cl. ...................................................... 14/71.3
[58] Field of Search ..................... 14/71.3, 69.5, 14.5, 14/17; 182/111; 211/171, 182; 52/641

[56] References Cited

U.S. PATENT DOCUMENTS

| | | | |
|---|---|---|---|
| 230,185 | 7/1880 | Gottlieb | 14/14 X |
| 393,433 | 11/1888 | Hopkins | 14/14 |
| 1,181,013 | 4/1916 | Inglis | 14/14 X |
| 1,483,148 | 2/1924 | Winkler | 182/111 |
| 3,138,812 | 6/1964 | Prosser | 14/71.3 |
| 3,213,963 | 10/1965 | Vogt | 182/111 |
| 3,456,757 | 7/1969 | Sain | 182/111 |
| 3,526,011 | 9/1970 | Alten | 14/71.3 |
| 3,528,118 | 9/1970 | Smith | 14/71.3 |
| 3,587,126 | 6/1971 | Potter | 14/71.3 |

*Primary Examiner*—Nile C. Byers
*Attorney, Agent, or Firm*—Andrus, Sceales, Starke & Sawall

[57] ABSTRACT

A ramp construction for a dockboard. The ramp includes a deck plate supported by a series of spaced generally parallel beams. Each beam is a formed metal structure composed of a pair of side members having diverging ends that are secured to the underside of the deck plate, and a generally horizontal base section which connects the lower extremities of the side members. Generally vertical plates are secured to the forward end of each side of each beam, and the plates project forwardly beyond the ends of the beam and are provided with hinge openings that receive hinge pins to connect the lip of the dockboard to the forward edge of the ramp.

15 Claims, 5 Drawing Figures

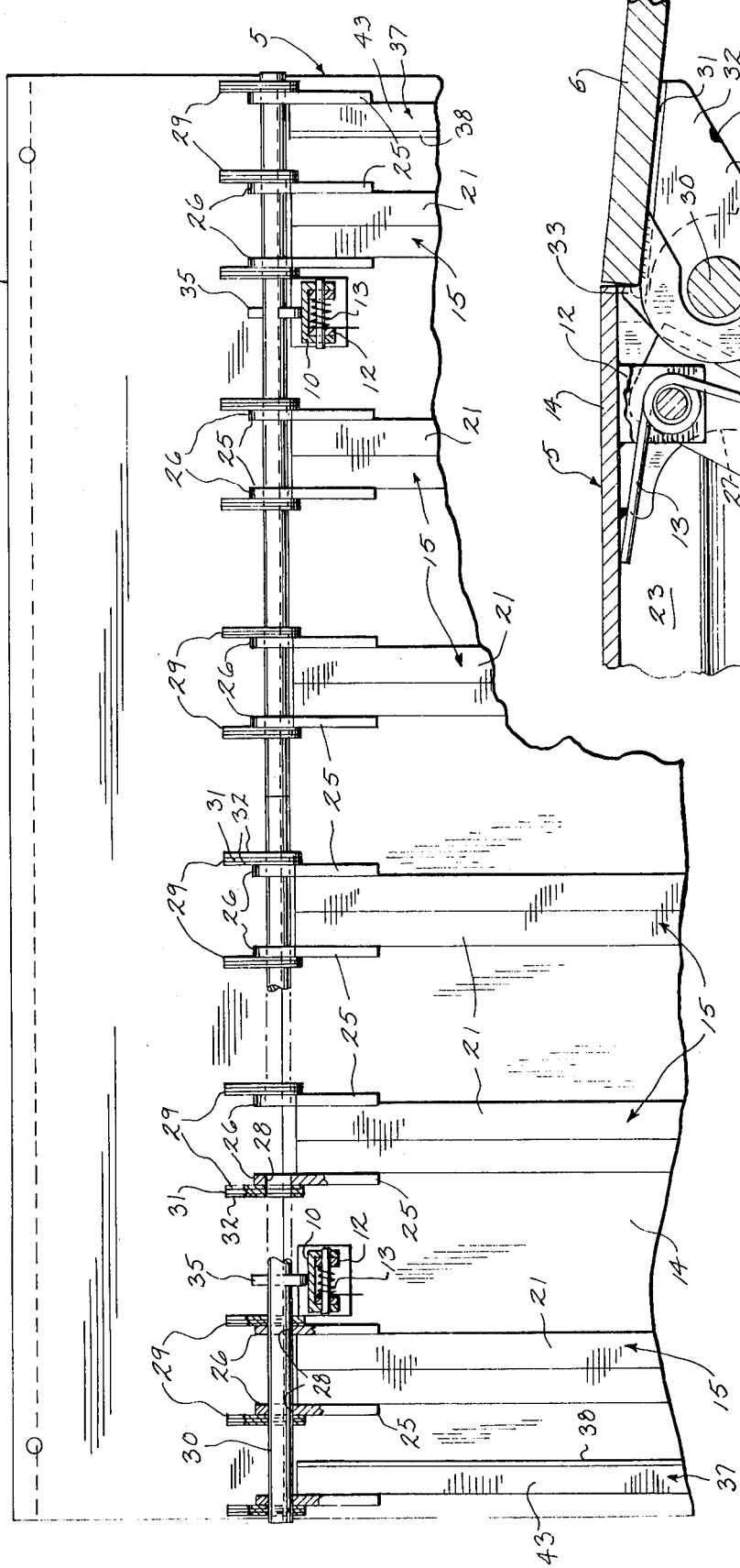
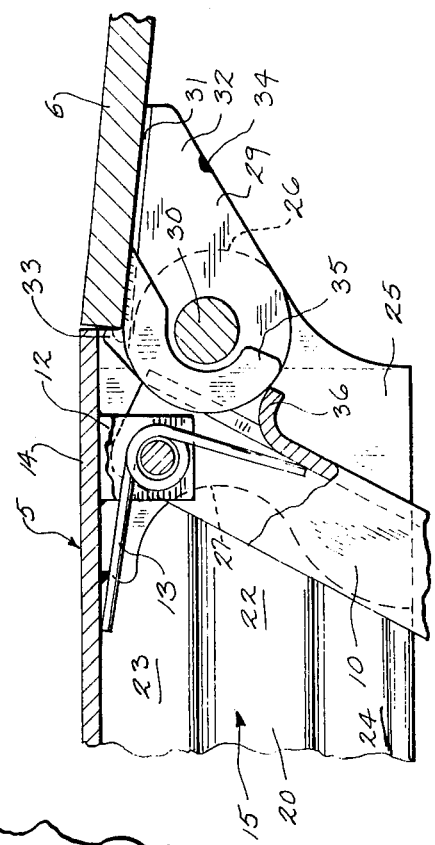
Fig. 2
Fig. 5

RAMP CONSTRUCTION FOR A DOCKBOARD

BACKGROUND OF THE INVENTION

In an adjustable pit mounted dockboard of the type shown in U.S. Pat. No. 3,137,017, the rear end of the ramp is hinged to the supporting structure so that the ramp can be moved from a generally horizontal, cross traffic position to an upwardly inclined position. Hinged to the forward edge of the ramp is a lip which is movable between a downwardly hanging pendant position and an extended position where the lip forms an extension to the ramp.

In the dockboard as shown in the aforementioned United States patent, the ramp is composed of a deck plate supported by a series of generally parallel, channel-shaped beams. The forward ends of the beams are connected together by a vertical header plate. In this type of construction, the beams are welded to the undersurface of the deck plate and the header is welded to the ends of the beam. The construction does not lend itself to automatic welding operations, and the welds joining the header to the beam ends must be made manually. U.S. Pat. No. 3,587,126 discloses a ramp construction in which the deck plate is supported by a series of beams composed of a vertical section and a lower horizontal flange. The forward ends of the flanges extend diagonally upward and are provided with a reverse bend to define an opening for the hinge pin. With the beam construction as shown in U.S. Pat. No. 3,587,126, the various components are difficult to form and welding must be done at various angles so that it is necessary to change the attitude or orientation of the deck plate during the welding operation. Again, this type of ramp construction does not lend itself to automatic welding procedures.

SUMMARY OF THE INVENTION

The invention relates to an improved ramp construction for a dockboard which has a substantially lesser weight than ramps as used in the past and which can be fabricated by automatic welding processes. The ramp of the invention includes a deck plate which is supported by a series of spaced, generally parallel beams, each of which is a formed metal structure composed of a pair of side sections which are joined together by a base section. The upper portions of the side sections of each beam diverge outwardly and are secured to the under surface of the deck plate, while the central portions of the side sections are joined together in flatwise relation.

Generally vertical plates are secured to each side of each beam and are welded edgewise to the undersurface of the deck plate. The forward ends of the plates project forwardly beyond the corresponding ends of the beams, and the projecting ends of the plates are provided with openings which receive a hinge pin that serves to hinge the lip to the forward edge of the ramp.

The ramp construction of the invention requires a lesser amount of overall welding than prior dockboard constructions and all of the welds can be made without changing the position or orientation of the deck plate, thereby enabling the welds to be made by automatic equipment.

As a further advantage, the ramp construction of the invention has a substantially lesser weight than prior ramps of the same capacity, or conversely, the ramp of the invention has a substantially greater capacity than prior ramps of the same weight.

The beams are formed by rolling from metal stock and approach an I-beam in cross sectional configuration, thereby providing an effective configuration for carrying the loads.

The hinge plates, which are attached to the forward ends of the beams, are shaped so that a uniform stress pattern is transmitted to the welds, thereby insuring that the hinge plates will have uniform strength against hinge loading in all directions. This results in a stronger hinge connection.

In addition, the hinge plate strength and the beam strength are independent in that either the hinge plate or the beams can be increased in dimension, depending on the particular installation.

Other objects and advantages will appear in the course of the following description.

DESCRIPTION OF THE DRAWINGS

The drawings illustrate the best mode presently contemplated of carrying out the invention.

In the drawings:

FIG. 2 is a plan view of the underside of the ramp and lip;

FIG. 5 is a fragmentary vertical section showing the ramp and the extended lip.

DESCRIPTION OF THE ILLUSTRATED EMBODIMENT

Figure 1:
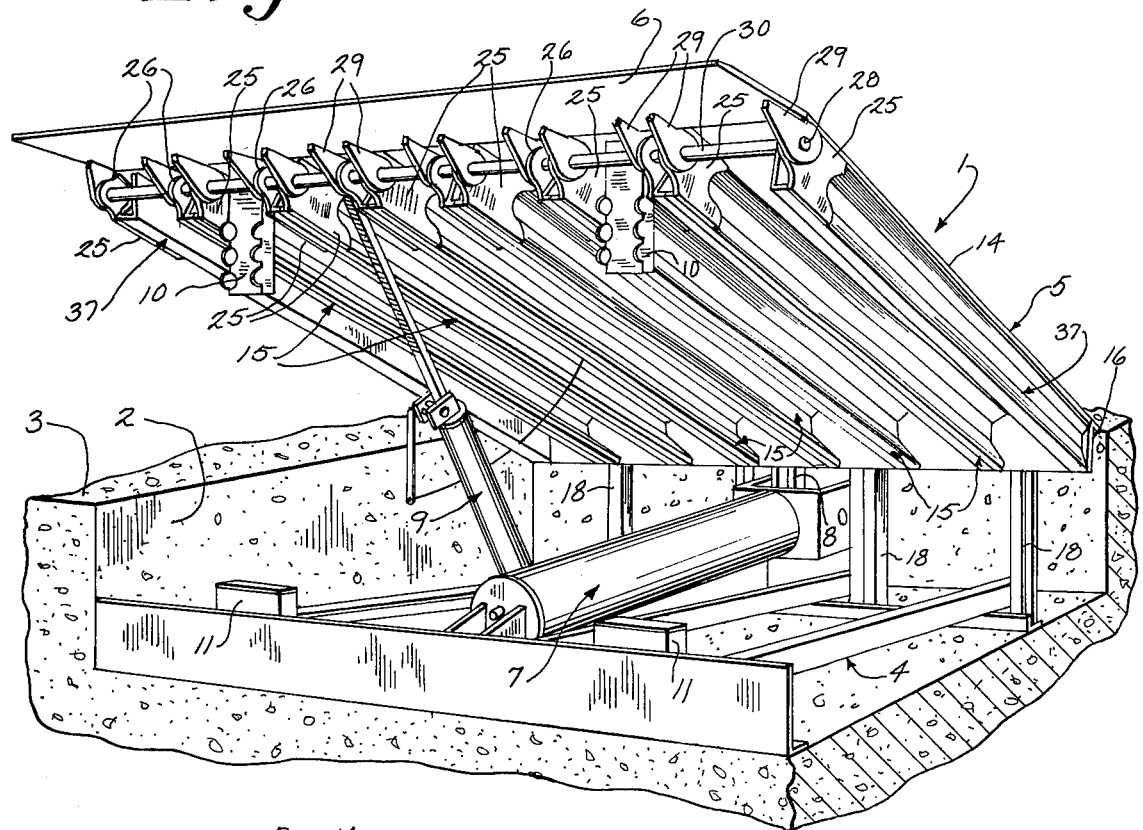
FIG. 1 is a perspective view of the dockboard having the ramp construction of the invention with the ramp being shown in the elevated position.

The drawings illustrate an adjustable pit mounted dockboard 1 which is mounted in a pit 2 or depression in a loading dock 3. The dockboard includes a supporting structure 4 or frame, and a ramp 5 is hinged at its rear edge to the supporting structure and is movable between a generally horizontal cross traffic position and an upwardly inclined position, as shown in FIG. 1.

Hinged to the forward edge of the ramp is a lip 6 which can be moved between a downwardly hanging pendant position and an extended position where the lip forms an extension to the ramp. Engagement of the rear surface of the lip with the forward edge of the ramp 5 limits the pivotal movement of the lip with respect to the ramp, so that the lip will not move beyond the extended position.

The ramp is adapted to be moved from the horizontal cross traffic position to the upwardly inclined position by anyone of a variety of mechanical, electro-mechanical or hydraulic mechanisms, and as illustrated in the drawings, a counterbalancing spring unit 7, similar to that disclosed in U.S. Pat. No. 3,528,118, is connected to the lower end of a lever arm 8 which is attached to the rear edge of the ramp. The force of the spring acts to pivot the ramp from the horizontal to the upwardly inclined position.

A conventional holddown mechanism 9, as shown in U.S. Pat. No. 3,646,627, is connected between the ramp and the supporting structure and is a unilateral device permitting free downward movement of the ramp, but preventing upward movement of the ramp, unless manually released.

The lip 6 is adapted to be moved from the pendant position to the extended by a lip lifting and latching mechanism, not shown, which can be similar to that described in U.S. Pat. No. 3,117,882

Hinged to the forward edge of the ramp are a pair of support legs 10 that are adapted to rest on supports 11 which extend upwardly from the frame 4 and support the ramp in a generally horizontal cross traffic position. The cross traffic legs can be similar to those shown in U.S. Pat. No. 3,137,017. As best illustrated in FIG. 2, each leg 10 is pivoted to lugs 12 attached to the undersurface of the ramp, and the legs are biased to the upright supporting position by the torsion springs 13. Pivotal movement of the lip 6 from the pendant position toward the extended position acts to pivot the legs 10 rearwardly to a retracted position in a manner similar to that described in U.S. Pat. No. 3,137,017.

In accordance with the invention, the ramp 5 is composed of a generally flat deck plate 14 which is supported by a series of generally parallel beams 15. A rear angle 16 is secured to the undersurface of the deck plate and is located at the rear ends of the beams 15.

To hinge the ramp to the supporting structure 4, a series of lugs 17 are secured to the angle 16, and the lugs 17 are pivotally connected to vertical supports 18 of frame 4 by pins 19.

Figure 4:
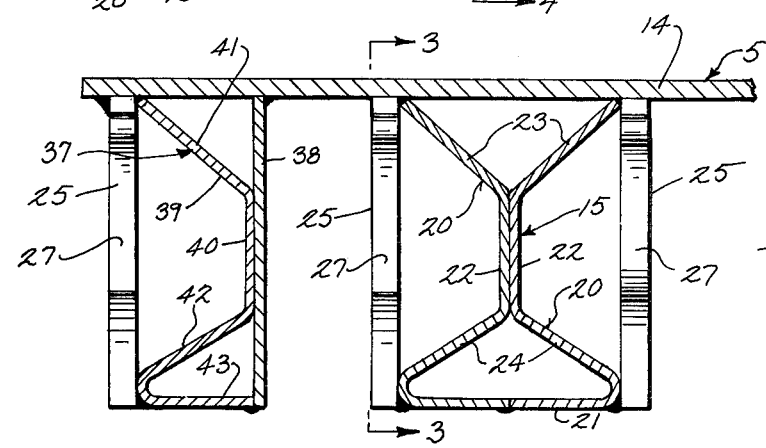
FIG. 4 is a transverse section of the ramp taken on line 4—4 of FIG. 3 and showing the forward ends of the beams.

Each beam 15 includes a pair of side sections 20 which are connected at their lower extremities by a base section 21. Each side section 20 includes a central portion 22, an outwardly diverging upper portion or leg 23 and an outwardly diverging lower section or leg 24 which connects the central portion 22 with the base section 21. As shown in FIG. 4, the central portions 22 of the side sections 20 are secured together flatwise, and the upper extremities of legs 23 are secured by welding to the undersurface of the deck plate 14. The diverging legs 23 provide a wide contact with the deck plate so that fewer beams are required.

In cross section the beams 15 approach an I-beam configuration which is most effective in carrying loads. The closed base, while providing stiffness for the beam, will permit some twist to enable the ramp to bend under load in the even the bed of the truck or carrier is tilted with respect to the loading dock 3.

The beams 15 are preferably fabricated by rolling to shape and the central portions 22 are then spot welded to maintain the configuration prior to welding the upper legs 23 to the undersurface of the deck plate 14.

Secured to each side of the forward end of each beam 15 is a lug or hinge plate 25. The plates 25 are disposed generally vertically with the upper edge of each plate being welded to the underside of the deck plate 14 and the lower extremity of the plate 24 being welded to the base section 21 of the beam 15. The curvature joining the lower legs 24 with the base 21 provides a groove which receives the weld metal during the welding operation.

Figure 3:
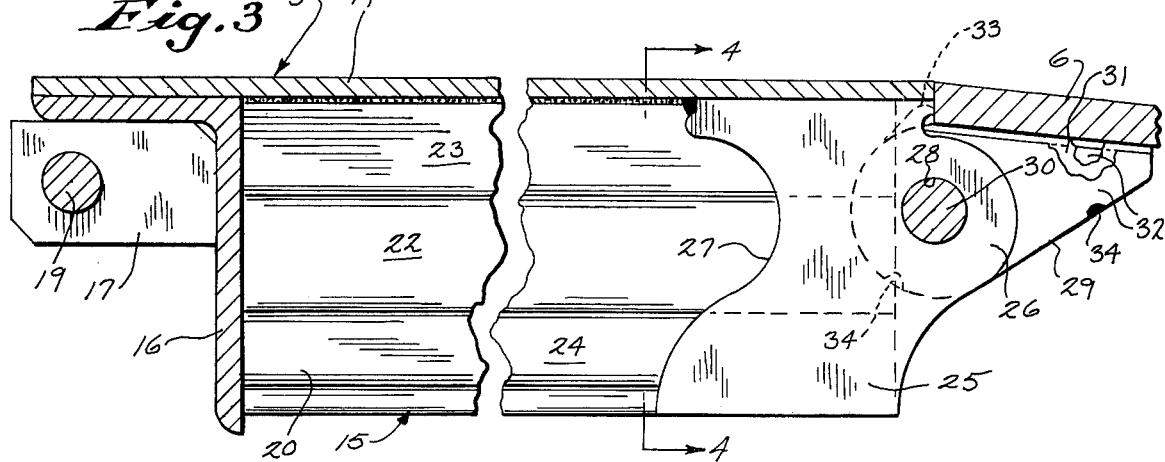
FIG. 3 is a vertical section of the ramp taken along line 3—3 of FIG. 4.

As best shown in FIG. 3, each hinge plate 25 includes a generally curved nose or projection 26 which extends forwardly beyond the end of the corresponding beam 15. The rear edge of each hinge plate is provided with a recess 27 which has a mating configuration with the nose 26 so that a series of plates 25 can be stamped from a single piece of metal without scrap.

An opening 28 is formed in each nose portion 25 of the plate 25 and is located forwardly of the beam end.

To hinge the lip 6 to the ramp 5, a series of lip lugs 29 are associated with the lip and the lip lugs 29 are pivoted to the hinge plates 25 by hinge pins 30. As best illustrated in FIG. 5, each lip lug is a laminated structure composed of a central section 31 and a pair of side sections 32. The central section 31 is provided with a projection 33 which engages the edge of the lip and is located beneath the forward edge of the deck plate 14 when the lip is in the extended position, as shown in FIG. 5.

Aligned grooves 34 are formed in the edges of the sections 31 and 32 and receive weld metal during welding of the sections together. Each lip lug 29 is provided with a hole and the hinge pins 30 extend through the holes and the aligned openings 28 to hinge the lip 6 to the forward edge of the ramp.

As disclosed in U.S. Pat. No. 3,137,017, the supporting legs 10 are adapted to be pivoted rearwardly to a retracted position as the lip 6 is moved from the pendant to the extended position, and to provide this action, a pair of wiper members 35 are secured to the undersurface of the lip and are adapted to ride against arms 36 which extend forwardly from the respective legs 10. As the lip is extended, the wipers 35 move against the arms 36 to pivot the legs rearwardly to the retracted position, as shown in FIG. 5.

Depending on the width of the deck plate 14, a half-beam 37 can be located along the side edges of the deck plate. As illustrated in FIG. 2, a half-beam 37 is positioned along each side edge and the half-beam includes a generally vertical section 38 and a contoured side section 39, having a central portion 40 which is secured flatwise to section 38. Extending upwardly from the central portion 40 is a diverging leg 41, while a downwardly diverging leg 42 extends downwardly from the central section and is connected to the lower end of section 38 by base section 43. The upper edges of section 38 and leg 41 are welded to the undersurface of deck plate 14. As illustrated in FIG. 5, a vertical hinge plate or lug 25 is secured to the diverging legs 41 and 42 of the half-beams 37, in the manner previously described.

The ramp construction of the invention lends itself to automatic welding processes in that all of the welds extend in a fore-to-aft direction. Thus, the welds can be made by automatic welding equipment without changing the position or orientation of the deck plate 14. This results in a substantial decrease in the time required for fabrication of the ramp.

The beams which are rolled to shape have a cross sectional configuration approaching that of an I-beam which is most effective in carrying loads. The beam configuration achieves a relatively wide contact with the deck plate, and while providing rigidity, enables the deck plate to twist under load in the event the carrier bed is tilted with respect to the deck plate.

The ramp construction provides a substantial weight savings, in the neighborhood of about 50%, over that of ramps of similar capacity, as used in the past, or by utilziing the same weight a 50% increase in capacity is achieved.

The configuration of the hinge plates 25 develops a uniform stress pattern in the welds with the result that the hinge plates have a substantially uniform strength against hinge loading in all directions.

Various modes of carrying out the invention are contemplated as being within the scope of the following claims particularly pointing out and distinctly claiming the subject matter which is regarded as the invention.

I claim:

1. A ramp construction for a dockboard, said ramp adapted to be hinged at its rear edge to a supporting structure, and a lip adapted to be hinged to the forward edge of the ramp, said ramp comprising a generally flat deck plate, a plurality of generally parallel beams secured to the undersurface of the deck plate and extending in a forward to rear direction, each beam including a pair of side members secured in spaced relation to the under surface of the deck plate and a base section connected to the side members and spaced beneath the deck plate, and a hinge plate secured to a side member and having a forward end portion projecting forwardly of the respective beam with the forward end portion having an opening therein to receive a hinge pin.

2. The ramp construction of claim 1, wherein the forward edge of the hinge plate is formed with an outwardly extending curved nose.

3. The ramp construction of claim 2, wherein the rear edge of the hinge plate is provided with a curved recess having a configuration to complement the curved nose.

4. The ramp construction of claim 1, in which the upper portions of the side members diverge upwardly and outwardly and the base section has a width substantially equal to the distance between the upper extremities of said side members, the upper edge of said hinge plate is disposed in contact with the undersurface of the deck plate and a side surface of said hinge plate is secured to one of said side members and to said base section.

5. The ramp construction of claim 1, wherein each side member includes a central portion and the central portions of the side members of each beam are secured flatwise together and the upper portions of the side members of each beam diverge upwardly and outwardly from the respective central portions, each side member of each of said beams also includes a lower portion which diverges downwardly and outwardly from the respective central portion and the lower extremities of said lower portions are connected to said base section.

6. A ramp construction for a dockboard, said ramp adapted to be hinged at its rear edge to a supporting structure, and a lip adapted to be hinged to the forward edge of the ramp, said ramp comprising a generally flat deck plate, a plurality of generally parallel beams secured to the undersurface of the deck plate and extending in a forward to rear direction, and a hinge plate secured to a side of a beam and having a forward end position extending forwardly of the forward end of the beam, said hinge plate being disposed vertically and the upper edge of the hinge plate being secured to the undersurface of the deck plate, the forward end portion of the hinge plate having an opening to receive a hinge pin for hinging the lip to the ramp.

7. The ramp construction of claim 6, wherein the rear end of the hinge plate terminates forwardly of the rear end of the respective beam.

8. The ramp construction of claim 6, wherein the forward edge of the hinge plate is formed with an outwardly extending curved nose, and the rear edge of the hinge plate is provided with a curved recess having a configuration to complement the curved nose.

9. In a dockboard, a supporting structure, a ramp hinged at its rear edge of the supporting structure and movable between a generally horizontal cross traffic position and an upwardly inclined position, a lip hinged to the forward edge of the ramp and movable between a downwardly hanging pendant position and an extended position where the lip forms an extension to the ramp, said ramp including a generally flat deck plate and a series of beams supporting said deck plate, each of said beams having an upper portion secured to the undersurface of the deck plate and having a lower portion spaced beneath the deck plate, a hinge plate connected to each of a plurality of said beams, each hinge plate secured to the undersurface of the deck plate and secured to the side of the respective beam, each hinge plate having an end portion projecting forwardly of the respective beam, and hinge means for hinging the lip to the projecting end portions of the hinge plates.

10. The dockboard of claim 9, wherein each beam includes a pair of upwardly and outwardly diverging upper legs that are secured to the undersurface of the deck plate and a pair of downwardly and outwardly diverging lower legs, each beam also including a base section connecting the lower legs.

11. The dockboard of claim 10, wherein the lower extremities of the upper legs of each beam are connected together.

12. The dockboard of claim 9, wherein each hinge plate is secured to the upper portion and to the lower portion of the side of the respective beam.

13. The construction of claim 9, wherein each beam includes a generally vertical section and a base section which extends laterally to the side of the verical section, said hinge plate being secured to the base section of the respective beam.

14. In a dockboard, a supporting structure, a ramp hinged at its rear edge to the supporting structure, and movable between a generally horizontal cross traffic position and an upwardly inclined position, a lip hinged to the forward edge of the ramp and movable between a downwardly hanging pendant position and an extended position where the lip forms an extension to the ramp, said ramp including a generally flat deck plate and a series of beams supporting said deck plate, each beam having a pair of upper outwardly diverging legs secured to the undersurface of the deck plate and each beam including a base section spaced beneath the deck plate, the width of the base section being substantially equal to the distance between the upper ends of said legs, and a pair of hinge plates secured to the side surfaces of each beam, each hinge plate having an upper edge secured to the undersurface of the deck plate and having a side surface secured to the respective upper leg and base section of the beam, each hinge plate having a generally curved projecting forward edge projecting forwardly of the beam and the deck plate, first opening means disposed in the projecting end portion of each hinge plate and disposed to receive a hinge pin, a series of lugs connected to the lip, second opening means disposed in said lugs and aligned with said first opening means, and a hinge pin extending through the aligned first and second opening means to hinge the lip to the ramp.

15. The dockboard of claim 14, wherein each lug is a laminated structure composed of a plurality of sections secured together in flatwise relation.

* * * * *

UNITED STATES PATENT AND TRADEMARK OFFICE
CERTIFICATE OF CORRECTION

PATENT NO. : 4,068,338
DATED : January 17, 1978
INVENTOR(S) : THOMAS G. ARTZBERGER It is certified that error appears in the above-identified patent and that said Letters Patent are hereby corrected as shown below:

Column 3, Line 4, Cancel "3,117,882" and substitute therefor ---3,117,332---, Column 3, Line 43, Cancel "even" and substitute therefor ---event---, Column 3, Line 53, Cancel "plate 24" and substitute therefor ---plate 25---, Column 3, Line 65, Cancel "nose portion 25" and substitute therefor ---nose portion 26---, Column 6, Line 30, CLAIM 13, Cancel "verical" and substitute therefor ---vertical---

Signed and Sealed this

Twenty-ninth Day of August 1978

[SEAL]

Attest:

RUTH C. MASON
Attesting Officer

DONALD W. BANNER
Commissioner of Patents and Trademarks